(12) United States Patent
Leustek et al.

(10) Patent No.: US 8,407,989 B2
(45) Date of Patent: Apr. 2, 2013

(54) REGENERATION STRATEGY FOR ENGINE EXHAUST (75) Inventors: Matthew Edward Leustek, Metamora, IL (US); Vadiraj Prakash Kulkarni, Dunlap, IL (US); Sylvain Joseph Charbonnel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 415 days.

(21) Appl. No.: 12/754,756

(22) Filed: Apr. 6, 2010

(65) Prior Publication Data
US 2011/0239623 A1 Oct. 6, 2011

(51) Int. Cl.
*F01N 3/00* (2006.01)
(52) U.S. Cl. ............... 60/295; 60/274; 60/285; 60/311
(58) Field of Classification Search ............ 60/274, 60/277, 285–287, 295–301, 311
See application file for complete search history.

(56) References Cited

U.S. PATENT DOCUMENTS

| | | | | |
|---|---|---|---|---|
| 4,574,589 A * | 3/1986 | Hasegawa et al. | ............ | 60/286 |
| 4,589,254 A | 5/1986 | Kume et al. | | |
| 5,090,200 A | 2/1992 | Arai | | |
| 5,253,475 A * | 10/1993 | Kabasin | ............ | 60/274 |
| 5,396,764 A * | 3/1995 | Rao et al. | ............ | 60/274 |
| 5,894,988 A * | 4/1999 | Brenner et al. | ............ | 431/6 |
| 6,598,387 B2 * | 7/2003 | Carberry et al. | ............ | 60/297 |
| 6,829,890 B2 | 12/2004 | Gui et al. | | |
| 7,069,721 B2 | 7/2006 | Gotou | | |
| 7,169,364 B2 | 1/2007 | Ohtake et al. | | |
| 7,340,886 B2 | 3/2008 | Kawashima et al. | | |
| 7,454,897 B2 | 11/2008 | Mizuguchi | | |
| 8,069,656 B2 * | 12/2011 | Baird et al. | ............ | 60/286 |
| 2003/0140623 A1 * | 7/2003 | Ootake | ............ | 60/297 |
| 2005/0166582 A1 * | 8/2005 | Gotou | ............ | 60/297 |
| 2005/0198944 A1 * | 9/2005 | Saitoh et al. | ............ | 60/295 |
| 2006/0179825 A1 * | 8/2006 | Hu et al. | ............ | 60/297 |
| 2006/0201142 A1 | 9/2006 | Marlett et al. | | |
| 2007/0199312 A1 | 8/2007 | Kapparos et al. | | |
| 2008/0104948 A1 | 5/2008 | Kapparos et al. | | |
| 2008/0307772 A1 | 12/2008 | Kawamura et al. | | |
| 2009/0056310 A1 * | 3/2009 | Xu et al. | ............ | 60/274 |
| 2009/0143954 A1 | 6/2009 | Leustek et al. | | |
| 2009/0188241 A1 * | 7/2009 | Sugiarto et al. | ............ | 60/295 |
| 2009/0188243 A1 * | 7/2009 | Williams et al. | ............ | 60/295 |

FOREIGN PATENT DOCUMENTS

| | | |
|---|---|---|
| EP | 1561922 A1 | 8/2005 |
| EP | 1643091 B1 | 4/2006 |
| EP | 1918542 A1 | 5/2008 |
| GB | 2452383 A | 3/2009 |

* cited by examiner

*Primary Examiner* — Thomas Denion
*Assistant Examiner* — Jesse Bogue
(74) *Attorney, Agent, or Firm* — Finnegan, Henderson, Farabow, Garrett & Dunner LLP (57) ABSTRACT

A method of regenerating a particulate filter of an exhaust system of an engine system is disclosed. The method may include determining a condition indicative of an accumulation of hydrocarbons in the particulate filter, and monitoring the particulate filter to determine when to initiate regeneration of the particulate filter. The method may also include selecting a regeneration profile for regeneration of the particulate filter based on the determined condition, and regenerating the particulate filter in accordance with the regeneration profile.

16 Claims, 5 Drawing Sheets

REGENERATION STRATEGY FOR ENGINE EXHAUST

TECHNICAL FIELD

The present disclosure relates generally to a system and a strategy for regeneration of exhaust after-treatment components, and more particularly, to a system and a strategy for the removal of accumulated hydrocarbons during regeneration.

BACKGROUND

Internal combustion engines may exhaust particulate matter and other pollutants into the atmosphere through its exhaust. Exhaust after-treatment devices, such as include Diesel Oxidation Catalysts (DOCs) and Diesel Particulate Filters (DPFs), may be placed in the path of the exhaust to separate or convert these pollutants to less noxious compounds. Since the volume of particulate matter collected in the DPF may eventually deteriorate engine performance, a method of regenerating these after-treatment devices is also provided. The present disclosure is directed to a system and a method for regeneration that may have advantages over existing regeneration technology.

SUMMARY OF THE INVENTION

In one aspect, a method of regenerating a particulate filter of an exhaust system of an engine system is disclosed. The method may include determining a condition indicative of an accumulation of hydrocarbons in the particulate filter, and monitoring the particulate filter to determine when to initiate regeneration of the particulate filter. The method may also include selecting a regeneration profile for regeneration of the particulate filter based on the determined condition, and regenerating the particulate filter in accordance with the regeneration profile.

In another aspect, an exhaust system of an engine system is disclosed. The exhaust system may include a particulate filter configured to remove particulate matter from an exhaust flow of the engine system, and a heating system configured to increase the temperature of the particulate filter for regeneration. The exhaust system may also include a controller that is configured to identify the occurrence of one or more of the following events: a burner of the exhaust system upstream of the particulate filter fails to ignite, a flame in the burner gets extinguished, a cumulative crank time of an engine of the engine system exceeds a preselected value, a servicing of the engine system, or a fault event of the engine system, and select a regeneration profile for regeneration of the particulate filter based on the identified events.

In yet another aspect, a method of regenerating a particulate filter positioned in an exhaust flow of an engine system is disclosed. The method may include monitoring the particulate filter to determine when to initiate regeneration of the particulate filter. The method may also include selecting a hold time at a first temperature based on an estimated accumulation of hydrocarbons in the particulate filter, and regenerating the particulate filter using a temperature profile that includes the hold time at the first temperature prior to an oxidation of particulate matter at a second temperature higher than the first temperature.

DETAILED DESCRIPTION

Figure 1:
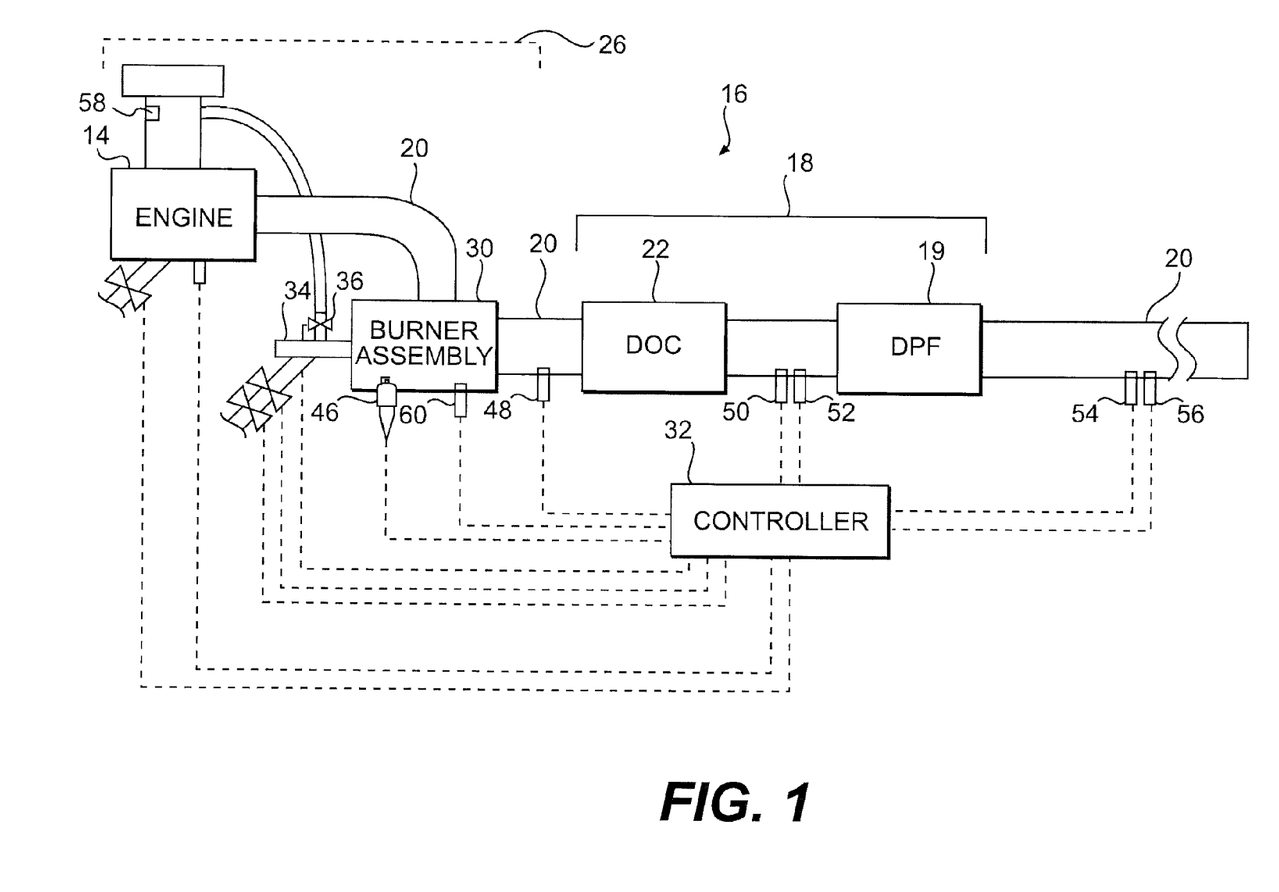
FIG. 1 illustrates an exemplary embodiment of the disclosed exhaust treatment system.

FIG. 1 illustrates an exemplary embodiment of exhaust treatment system 16 of engine 14. Engine 14 may include any type of internal combustion engine known in the art. Although engine 14 will be discussed hereinafter as being a diesel engine, engine 14 can, in general, be an internal combustion engine that burns any type of fuel. Exhaust from engine 14 may be directed through conduit 20 to exhaust treatment system 16. Exhaust treatment system 16 may include one or more after-treatment devices 18 that are configured to remove at least some pollutants from the exhaust of engine 14. For purposes of this discussion, DPF 19 and DOC 22 will be described as being the after-treatment devices 18. However, it should be noted that, in general, exhaust treatment system 16 may include other after-treatment devices 18 (such as additional DPFs, DOCS, Selective Catalytic Reduction systems, Lean NOx Traps, etc.) in addition to DPF 19 and DOC 22.

The after-treatment devices 18 may be configured to be thermally regenerated. Exhaust treatment system 16 may include a heating system 26, which may be configured to increase the temperature of an after-treatment device 18 (such as, for example, DPF 19) for regeneration. There are a number of different ways that heating system 26 may be configured to increase the temperature of DPF 19. For example, in some embodiments, heating system 26 may be configured to apply heat directly to DPF 19 via a heating device integral with, or positioned adjacent to, DPF 19. An example of such a heating device may include an electric heating element (not shown). Alternatively or additionally, heating system 26 may be configured to increase the temperature of DPF 19 by transferring heat to DPF 19 from the exhaust gases flowing therethrough. In such embodiments, heating system 26 may be configured to apply heat to exhaust gases upstream of DPF 19. Heat may be applied to the exhaust gases upstream of DPF 19 in multiple ways. For example, in some embodiments, the engine operating parameters may be altered to increase the temperature of the exhaust. In some of these embodiments, a rich air/fuel mixture may be temporarily directed to the combustion chambers of engine 14 to increase the exhaust gas temperature. In other embodiments, other operating parameters, such as engine speed, load, timing, and/or exhaust valve actuation may be manipulated to control the exhaust gas temperature. In some embodiments, exhaust gases may be heated by post injection techniques. For example, additional fuel may be injected into the combustion chambers of engine 14 after the combustion has taken place. This may result in the additional fuel being burned in the exhaust system, thereby increasing the exhaust gas temperature. In some embodiments, heating system 26 may include one or more heating devices (such as, for example, an electric heating element and/or flame producing burner) which may heat the exhaust gases flowing through conduit 20 upstream of an after-treatment device 18. Any type of these or other types of heating systems 26 that are configured to provide heat for regeneration may be used to regenerate DPF 19.

In one embodiment, heating system 26 may include a burner assembly 30 positioned upstream of DPF 19. Burner assembly 30 may be positioned anywhere along exhaust conduit 20 between engine 14 and after-treatment device 18. Burner assembly 30 may include a fuel injector 34 to supply fuel and an air supply 36 to supply air to burner assembly 30. Burner assembly 30 may also include a spark plug 46 to provide a spark to ignite the air/fuel mixture delivered to the burner assembly 30. Combustion of fuel in the burner assembly 30 may provide heat to the exhaust flowing therethrough to regenerate DPF 19. Although exhaust treatment system 16 is shown with a single DPF 19, a single DOC 22, and a single burner assembly 30, exhaust treatment system 16 may include any number of these devices. For example, in one embodiment, exhaust treatment system 16 may include a single burner assembly 30 configured to regenerate multiple DPFs.

Exhaust treatment system 16 may include multiple sensors configured to detect operating parameters of engine 14 and exhaust treatment system 16. Exhaust treatment system 16 may also include a controller 32 configured to control the system based at least in part on this data. The sensors may include a first temperature sensor 50 and a first pressure sensor 52 upstream of DPF 19, and a second temperature sensor 54 and a second pressure sensor 56 downstream of DPF 19. These sensors may be configured to measure the temperature and pressure of exhaust entering and exiting DPF 19. Controller 32 may maintain a record of the operating parameters measured by one or more of the sensors. Some embodiments of exhaust treatment system 16 may also include a flame sensor 60 configured to detect a flame in burner assembly 30. It should be noted that the above description of sensors is exemplary only and, in general, exhaust treatment system 16 may include any number and type of sensors configured to detect operating parameters of the system. For example, any type of sensor capable of detecting a flame in burner assembly 30 may function as flame sensor 60. In some embodiments, a temperature sensor 48 positioned downstream of burner assembly 30 (or within the burner assembly 30) may function as flame sensor 60. In some other embodiments, a temperature sensor may be positioned upstream of burner assembly 30, and the difference in temperature upstream and downstream of burner assembly 30 may indicate the presence of a flame in burner assembly 30.

Controller 32 may trigger regeneration of DPF 19 based on the detected operating parameters of engine 14 and exhaust treatment system 16. In some embodiments, controller 32 may activate burner assembly 30 to trigger regeneration of DPF 19 in response to a determination that more than a predetermined amount of particulate matter (or "soot") may be trapped in DPF 19. In general, controller 32 may be configured to trigger regeneration in response to any triggering condition known in the art. Non limiting examples of triggering conditions that may trigger regeneration of DPF 19 may include: operation of engine 14 for a predetermined amount of time; consumption of a predetermined amount of fuel by engine 14; detection of an elevated backpressure in exhaust treatment system 16; detection of a pressure differential across DPF 19 greater than a predetermined amount, etc. Alternatively or additionally, regeneration of DPF 19 may also be triggered by an operator of engine 14 by activating a switch or by other known means.

During some operating conditions of engine 14, the hydrocarbon content in the exhaust entering DPF 19 may be high. These operating conditions may include cold start conditions of engine 14 when cold combustion chamber walls lead to poor vaporization of fuel, resulting in over-rich concentrations of fuel in the exhaust from engine 14. Improper functioning of engine or exhaust system components may also increase hydrocarbon emissions in the exhaust. In some cases, repair or service of engine 14 (such as, repair of fuel system, replacement of fuel injectors, etc.) may also temporarily increase the amount of hydrocarbons emitted into the exhaust. The excess hydrocarbon in the exhaust may accumulate in DPF 19 and DOC 22 (and/or in any other after-treatment device 18) positioned downstream of burner assembly 30. These accumulated hydrocarbons may combust during regeneration resulting in unstable regeneration. Unstable regeneration may include rapid incineration of accumulated matter in the DPF resulting in a sudden increase in temperature. As the filter temperature increases, soot oxidation rates increase, resulting in production of enough heat from the exothermic reaction to further increase the soot oxidation rate. This uncontrolled exothermic reaction during regeneration may result in temperatures that are high enough to melt, crack, or otherwise damage the DPF filter.

To reduce the likelihood of these uncontrolled exothermic reactions during regeneration, controller 32 may be configured to estimate the amount of hydrocarbons emitted in the exhaust as a result of these operating conditions, and configure the regeneration profile of the DPF 19 to evaporate at least a portion of these hydrocarbons before a soot oxidation step of the regeneration profile. Controller 32 may include control logic or another mechanism that is configured to identify a condition that may cause excess hydrocarbon emissions into the exhaust. In some embodiments, this logic may include the setting of a flag at the occurrence of an excess hydrocarbon emission event. For instance, a flag may be set at the occurrence of a loss of combustion event or a fail to ignite event in burner assembly 30. Similarly, flags may be set to indicate the occurrence of other excess hydrocarbon emission events. When a regeneration is triggered, the controller 32 may estimate the amount of hydrocarbons that may be present in the exhaust treatment system 16 based on the flags, and may include a preheat step in the regeneration profile if the temperature of the exhaust is below that required for the hydrocarbons to evaporate. This preheat step may be configured to evaporate at least a portion of the accumulated hydrocarbons in DPF 19 before a soot oxidation step of the regeneration profile. Evaporation of at least a part of the accumulated hydrocarbons may prevent an uncontrolled exothermic reaction during the soot oxidation step. If the estimated amount of hydrocarbons in the exhaust is low, or if the temperature of the exhaust is such that any hydrocarbons that were emitted would have evaporated, then the controller 32 may execute any desired regeneration profile configured to oxidize the accumulated particulate matter.

Although in description above, flags are used to identify a condition where excess hydrocarbons may be present in the exhaust treatment system 16, this is not a requirement. In general, any method that identifies a condition where excess hydrocarbons may be present the exhaust treatment system 16 may be used to trigger the inclusion of a preheat step in the regeneration temperature profile of DPF 19. In some embodiments, the controller 32 may estimate the amount of hydrocarbons accumulated in DPF 19 and configure the duration of the preheat step to evaporate at least a portion of the accumulated hydrocarbons in DPF 19 prior to the soot oxidation step. In these embodiments, if controller 32 determines that the amount of accumulated hydrocarbons in the DPF 19 is low, or below a threshold value, the preheat time may be set to zero. In these embodiments, the duration of the preheat time may be selectively increased as the amount of accumulated hydrocarbons in the DPF 19 increases.

It should be noted that although controller 32 is described as executing a regeneration profile following a preheat step, this is not a requirement. For instance, in some embodiments, controller 32 may not regenerate DPF 19 after a preheat step. In these embodiments, engine 14 may continue to operate normally after a preheat step and controller 32 may continue to monitor the system to detect another regeneration trigger.

Figure 2:
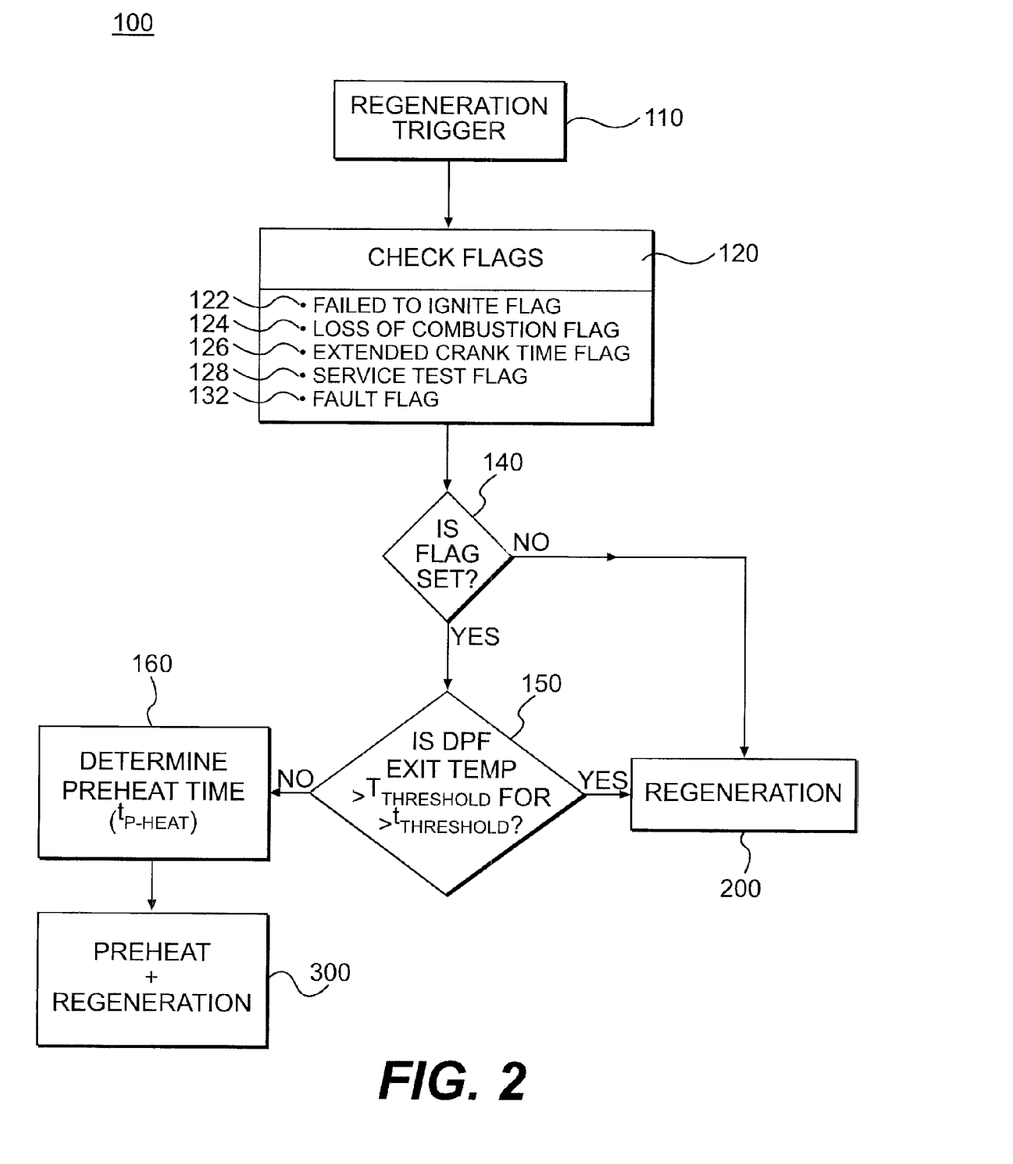
FIG. 2 is a flow chart illustrating an exemplary regeneration control process of the current disclosure.

FIG. 2 is a flow chart illustrating an exemplary regeneration control process 100 after a regeneration is triggered (step 110). As discussed earlier, regeneration may be triggered by any known method. For instance, in some embodiments, regeneration may be triggered when the soot load in DPF 19 exceeds a predetermined value. In some embodiments, the predetermined value that triggers regeneration may depend upon the operating environment of engine 14. In one such embodiment, regeneration may be triggered based on normal triggers for regeneration in addition to the altitude of the system. For instance, in an embodiment where controller 32 triggers regeneration of DPF 19 when the soot load in DPF 19 reaches a threshold value, then in an altitude based version of the embodiment, the threshold soot load that triggers regeneration may depend on altitude of the system. A lower threshold value of soot load may trigger regeneration at a higher altitude and a higher threshold value of soot load may trigger regeneration at a lower altitude. For the same engine operating conditions, the exhaust flow at a higher altitude may be lower than the exhaust flow at a lower altitude. A lower exhaust flow may make temperature control of DPF 19 during regeneration difficult. Decreasing the soot load that triggers regeneration at a higher altitude may help maintain the temperature of the DPF 19 during regeneration below an acceptable limit. The altitude of the system may be measured from altitude sensor 58, or determined based on the readings of any of other sensor of engine 14 or exhaust treatment system 16.

Figure 2A:
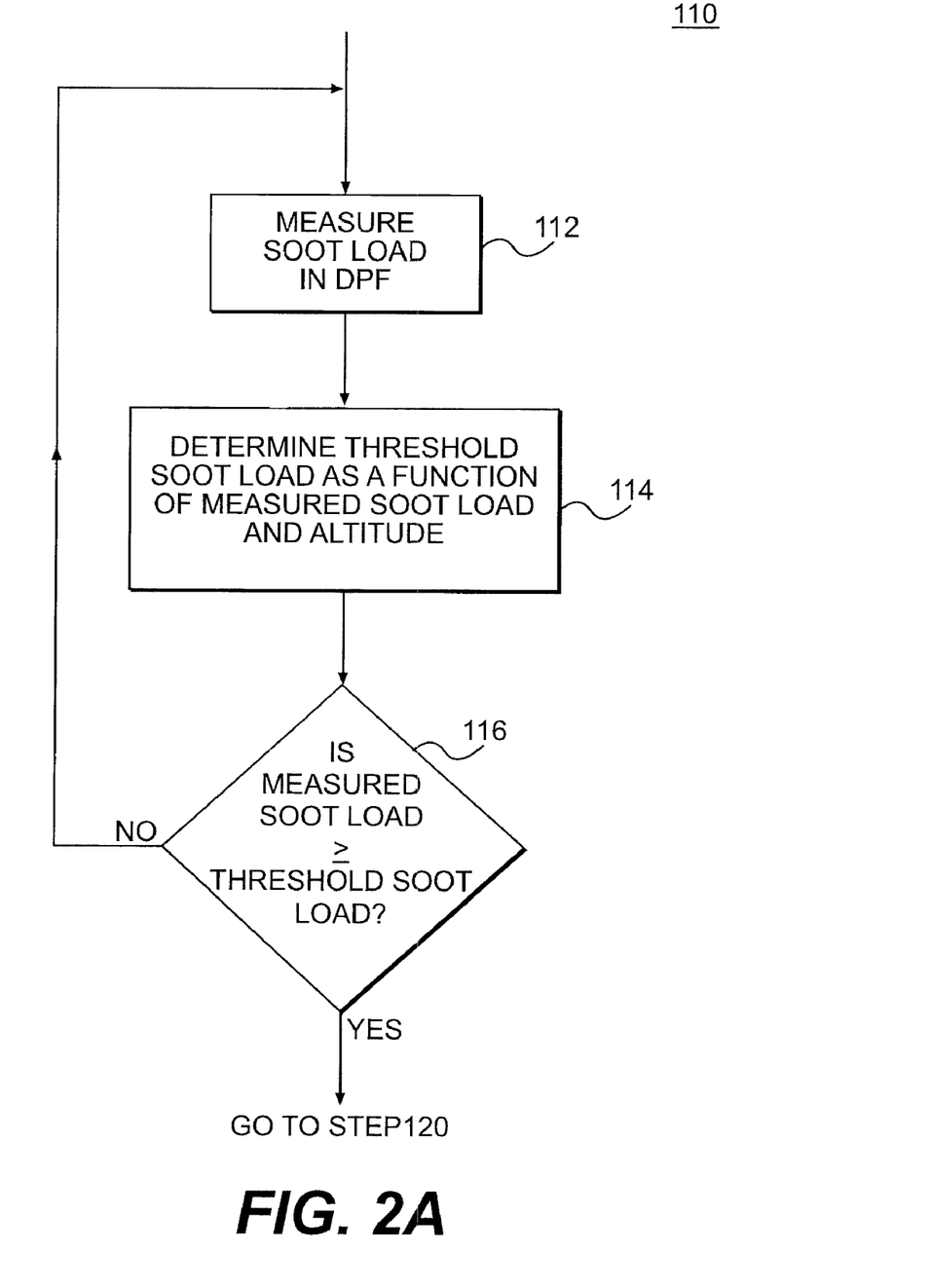
FIG. 2A is a flow chart illustrating an exemplary method of triggering regeneration in the regeneration control process of FIG. 2.

FIG. 2A is a flow chart illustrating an exemplary method of triggering regeneration (step 100) based on soot load in the DPF and altitude of the system. Controller 32 may continuously (or periodically) monitor the soot load in DPF 19 (step 112). The controller 32 may then determine the threshold soot load as a function of the measured soot load and altitude (step 114). This determination may be made by any means. For instance, in some embodiments, a table or a map may indicate the threshold soot load for different altitudes. In other embodiments, a model may provide the threshold soot load. Controller 32 may then trigger regeneration if the soot load in DPF 19 is greater than or equal to the threshold soot load (step 116).

With reference to FIG. 2, after a regeneration is triggered, controller 32 may determine (step 120) if one or more events that increase the amount of hydrocarbons in the exhaust ("excess hydrocarbon emission events") have occurred after the last regeneration. In one embodiment, this step may include determining if any flags that indicate the occurrence of an excess hydrocarbon emission event are set (step 120). In some embodiments, these flags may include a fail to ignite flag 122, a loss of combustion flag 124, an extended cranking flag 126, a service flag 128, and an engine faults flag 32. Additionally or alternatively, other embodiments may include other flags that indicate the occurrence of an excess hydrocarbon emission event.

In some instances, conditions (such as air-fuel ratio, exhaust flow, etc.) within burner assembly 30 may cause the fuel air mixture in burner assembly 30 to not ignite when desired. Such a 'fail to ignite' event within burner assembly 30 may cause the fuel delivered through fuel injector 34 to pass un-burnt to DPF 19. The fail to ignite flag 122 may indicate occurrences of such events since the last regeneration. In some instances, the flame in the burner assembly 30 may get extinguished while fuel injector 34 continues to direct fuel to the burner assembly 30. This un-burnt fuel may pass along with the exhaust flowing therethrough to DPF 19 and DOC 22. The loss of combustion flag 124 may identify such occurrences of flame extinguishment in burner assembly 30 since the last regeneration. During starting of engine 14, if all the fuel in the combustion chambers of engine 14 do not ignite, this fuel may pass along with the exhaust to DPF 19 and DOC 22. Extended cranking of the engine may increase the amount of un-burnt fuel that may end up in the exhaust. Controller 32 may include a counter that keeps track of the cumulative cranking time of engine 14. The extended cranking flag 126 may be set when the cumulative cranking time exceeds a predetermined value. Some defects of the engine 14 (such as, for example, defects in the common rail fuel system, fuel injectors, etc.) may also increase the amount of hydrocarbons in exhaust. The engine fault flag 132 may be set to identify the presence of such a defect. In some cases, replacement or the service of a part (such as fuel injector) may temporarily increase the amount of hydrocarbons in the exhaust. The service flag 128 may be set after the replacement or service of a such a part.

If a flag indicating an excess hydrocarbon emission event is set (step 140), the controller 132 may check to see if the temperature of the exhaust exiting DPF 19 has been above a predetermined value for a predetermined period of time (step 150). If the exhaust temperature has been higher than the predetermined value for a predetermined period of time, then any hydrocarbons accumulated in DPF 19 may have already evaporated due to the hot exhaust flowing through DPF 19. Therefore, the controller 132 may perform a normal regeneration (step 200) of the controller 132. The normal regeneration may be performed using any desired regeneration profile. Similarly, if a flag indicating an excess hydrocarbon emission event is not set (step 140), then there may not be sufficient accumulated hydrocarbons in DPF 19 to cause an uncontrolled exothermic reaction during regeneration, and the controller 132 may perform a normal regeneration (step 200) of DPF 19.

If a flag is set (step 140) and the temperature of the exhaust exiting DPF 19 is not above a predetermined value for a predetermined period of time (step 150), then the controller 132 may estimate the amount of hydrocarbons emitted as a result of the excess hydrocarbon emission events, and determine a preheat time $t_{p\text{-}heat}$ (step 160) to evaporate at least a portion of these emitted hydrocarbons. The controller 32 may then regenerate DPF 19 by using a modified regeneration profile. The modified regeneration profile may be a regeneration profile configured to evaporate at least a portion of the hydrocarbons emitted prior to the burning of soot in a soot oxidation step. In some embodiments, the modified regeneration profile may be a modification of the normal regeneration profile to include a preheat step at the beginning of the normal regeneration profile (step 300). The preheat step may include a step where DPF 19 (or the exhaust flowing through DPF 19) is heated and maintained at a preheat temperature for the calculated preheat time $t_{p\text{-}heat}$. The preheat temperature may be any temperature below the soot oxidation temperature which can evaporate the hydrocarbons. In some embodiments, the soot oxidation temperature of DOC 22 may be around 550° C. and the soot oxidation temperature of DPF 19 may be around 650° C. In these embodiments, the preheat temperature may be any temperature (such as, for example, about 500° C.) below 550° C.

Figure 3:
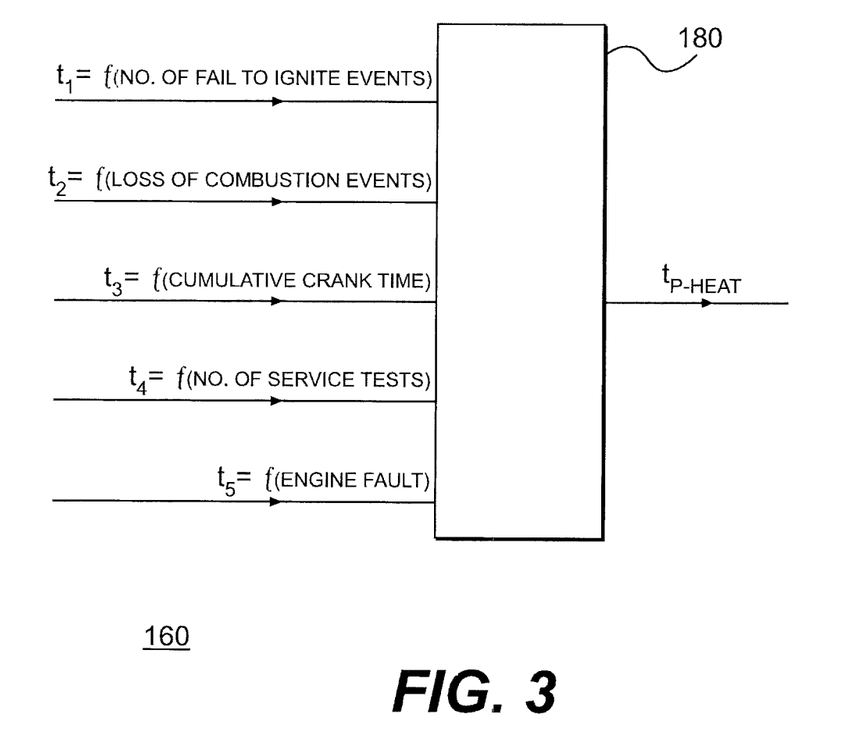
FIG. 3 is a schematic illustration of an exemplary process to determine preheat time in the regeneration control process of FIG. 2.

FIG. 3 is a schematic illustration of an exemplary process used by controller 32 to estimate the amount of emitted hydrocarbons and determine the preheat time $t_{p\text{-}heat}$ (that is, step 160 of FIG. 2) needed to evaporate at least a portion of these hydrocarbons. The preheat time $t_{p\text{-}heat}$ may be determined based on the excess hydrocarbon emission events that have occurred since the last regeneration. Controller 32 may include logic that assigns a time value for each individual excess hydrocarbon emission event that has occurred. A time value associated with any particular excess hydrocarbon emission event may be an estimate of the amount of time DPF 19 has to be maintained at the preheat temperature to evaporate a desired portion of the hydrocarbons emitted by that particular excess hydrocarbon emission event. In some embodiments, these time values may be assigned using maps or tables. For example, if a total of three fail to ignite events have occurred since the last regeneration, controller 32 may assign a time value of $t_1$ for this excess hydrocarbon emission event based on a map that indicates an estimated amount of time needed to evaporate a portion of the hydrocarbons that may be emitted by the three fail to ignite events, at a particular temperature (such as the preheat temperature). Similarly, based on the number of loss of combustion events that occurred, a map may assign a time value of $t_2$, and based on the cumulative crank time, the number of service tests, and the number or type of engine faults, maps may assign time values of $t_3$, $t_4$, and $t_5$ respectively. In some embodiments, the maps may assign a time value based on the excess hydrocarbon emission event and other operating conditions of the system (such as, for example, the soot load in DPF 19). It is also contemplated that, in some embodiments, these time values may be computed using models or estimated by other means.

Controller 32 may include logic 180 or another mechanism that determines the preheat time $t_{p\text{-}heat}$ based on the individual time values of $t_1$, $t_2$, $t_3$, $t_4$, and $t_5$. In some embodiments, preheat time $t_{p\text{-}heat}$ may correspond to the maximum time of the individual time values of $t_1$, $t_2$, $t_3$, $t_4$, and $t_5$. However, in general, preheat time $t_{p\text{-}heat}$ may be determined as any function of some or all of the individual time values $t_1$, $t_2$, $t_3$, $t_4$, and $t_5$. For example, in some embodiments, preheat time $t_{p\text{-}heat}$ may be the sum of some or all of the individual time values. In some embodiments, a map or table may determine preheat time $t_{p\text{-}heat}$ based on at least some of the individual time values. Preheat time $t_{p\text{-}heat}$ may represent an estimate of the amount of time DPF 19 has to be maintained at the preheat temperature to evaporate a desired portion of the estimated accumulated hydrocarbons in the after-treatment components 18 of the exhaust treatment system 16.

Figure 4:
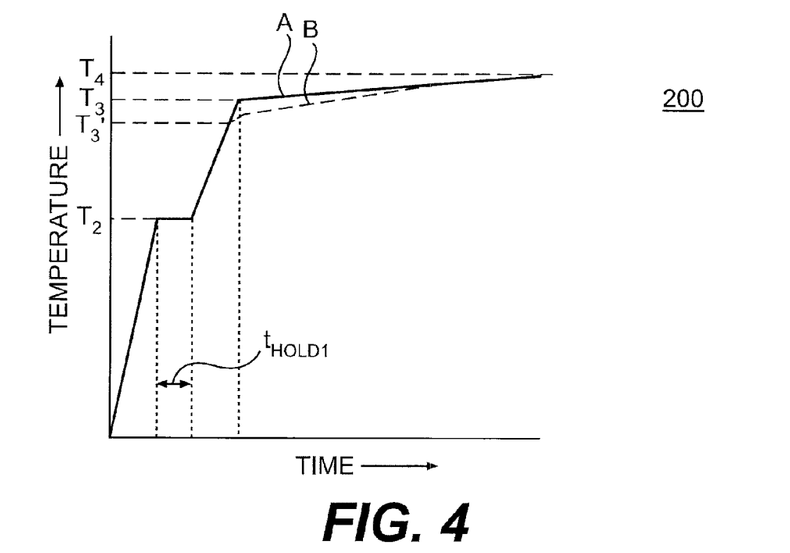
FIG. 4 illustrates an exemplary regeneration profile used to regenerate a diesel particulate filter (DPF) in the process of FIG. 2.

As explained earlier, any regeneration profile may be used to regenerate DPF 19 when controller 32 determines that accumulated hydrocarbons (if any) in DPF 19 will not cause an uncontrolled exothermic reaction during the regeneration process. FIG. 4 illustrates an exemplary regeneration profile that may be used for regeneration (step 200) when there is no concern of an uncontrolled exothermic reaction due to accumulated hydrocarbons. The regeneration profile may include a series of temperature increases and temperature holds. Controller 32 may effectuate the regeneration profile of FIG. 4 by controlling burner assembly 30. For example, controller 32 may effectuate a temperature increase of DPF 19 at a predetermined rate up to a second predetermined temperature $T_2$. Controller 32 may then effectuate a temperature hold by maintaining the temperature of DPF 19 at $T_2$ for a predetermined amount of time ($t_{hold1}$). Second predetermined temperature $T_2$ may represent a temperature at which soot oxidizes in DOC 22 (or another after-treatment device 18) of the exhaust treatment system 16. Further, controller 32 may then effectuate another temperature increase of DPF 19 at a predetermined rate to a higher third predetermined temperature of $T_3$. Third predetermined temperature $T_3$ may represent the temperature at which soot oxidizes in DPF 19. At $T_3$, the soot accumulated in DPF 19 may start to burn. As the soot burns, the temperature in DPF 19 may increase as shown by the curve marked "A" in FIG. 4.

In some embodiments, the third predetermined temperature $T_3$ may depend on the soot load in DPF 19. In embodiments where the threshold soot load that triggers regeneration depends on the altitude, third predetermined temperature $T_3$ may be lower at higher altitudes. As the soot load in DPF 19 increases, third predetermined temperature $T_3$ may increase. For example, at a higher altitude, after the temperature hold at $T_2$, controller 32 may effectuate a temperature increase of DPF 19 to a third predetermined temperature $T_3'$ which is lower than $T_3$. From $T_3'$, the temperature in DPF 19 may increase as the soot in the DPF burns. Because the exhaust flow rate through DPF 19 is lower at higher altitudes, the rate of temperature increase in DPF 19 as the soot burns (shown by curve marked "B") may be higher at a higher altitude. Since it is desirable to maintain a final DPF temperature at or below an acceptable temperature $T_4$, the third predetermined temperature $T_3'$ at a particular altitude may be selected so that the final DPF temperature may be at or below the acceptable temperature $T_4$.

Although the temperature ramp rates in FIG. 4 are depicted to be uniform, in reality, they may not be. That is, the predetermined rates of temperature increases to $T_2$ and $T_3$ (or $T_3'$) may include multiple ramp rates. In general, the temperature ramp rate may be chosen to reduce regeneration time and minimize temperature over-shoot. Similarly, any value may be selected for the second predetermined temperature $T_2$, and the hold time $t_{hold1}$ at this temperature. In some embodiments, these values may be selected to oxidize an estimated amount of trapped soot in DOC 22 (or another after-treatment device 18) while optimizing the regeneration process.

Figure 5:
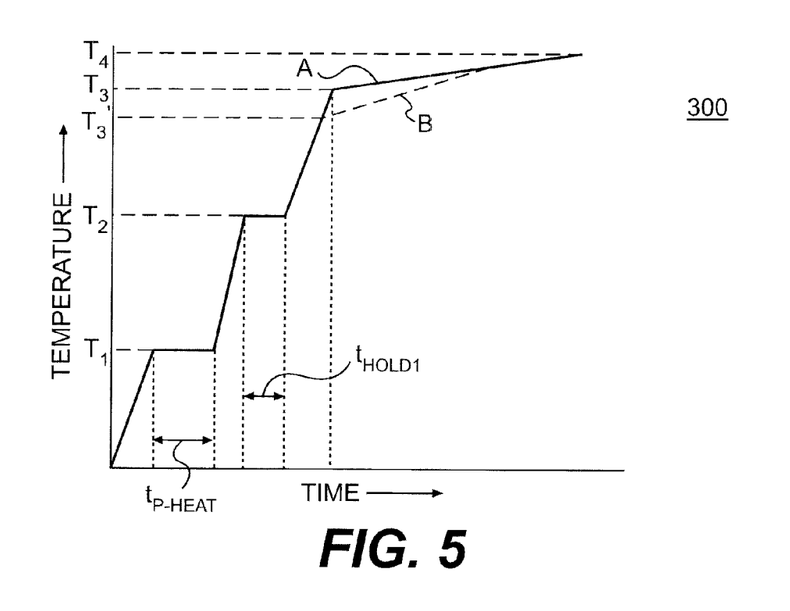
FIG. 5 is an exemplary modified regeneration profile used to regenerate a DPF having excess accumulated hydrocarbons therein, in the process of FIG. 2.

FIG. 5 illustrates an exemplary regeneration profile including a preheat step (step 300) to evaporate at least a part of the accumulated hydrocarbons in DPF 19. As explained earlier, such a regeneration profile may be used for regeneration (step 300) when controller 32 determines that accumulated hydrocarbons in DPF 19 may cause an uncontrolled exothermic reaction in the DPF 19 during regeneration. In this case, controller 32 may first effectuate an increase in temperature of DPF 19 to a preheat temperature of $T_1$ and maintain this temperature for a preheat time of $t_{p\text{-}heat}$. Any values may be chosen for preheat temperature $T_1$. Preheat temperature may be any temperature below the soot oxidation temperature that may evaporate the emitted hydrocarbons. As described earlier, the preheat time $t_{p\text{-}heat}$ may be determined based on the expected amount of accumulated hydrocarbons in DPF 19 (step 160 of FIG. 2, and FIG. 3). After the hold time, the controller 32 may then regenerate DPF 19 following any regeneration profile. In some embodiments, after the expiry of the preheat time $t_{p\text{-}heat}$, the controller 32 may follow the same regeneration profile of FIG. 4. That is, after holding the temperature of DPF 19 at $T_1$ for a time of $t_{p\text{-}heat}$, the controller 32 may effectuate a temperature increase of DPF 19 at a predetermined rate to the second predetermined temperature $T_2$ and hold the DPF 19 at this temperature for the hold time of $t_{hold1}$ to oxidize the soot in DOC 22. After this step, the controller 32 may increase the temperature of DPF 19 to the third predetermined temperature of $T_3$ to oxidize (burn) the soot in DPF 19. As explained earlier, in some embodiments, the controller 32 may increase the temperature of DPF 19 to a third predetermined temperature of $T_3'$ such that the final DPF temperature after soot oxidation is at or below the acceptable temperature $T_4$. Maintaining DPF 19 at $T_1$ for $t_{p-heat}$ amount of time may evaporate a sufficient amount of accumulated hydrocarbons from DPF 19 such that any remaining accumulated hydrocarbons in DPF 19 may not cause an uncontrolled exothermic reaction when the temperature of the DPF is raised to the third predetermined temperature of $T_3$ to oxidize the soot in DPF 19.

Although the preheat step is described as being included (FIG. 5) or not included (FIG. 4) based on the estimated amount of hydrocarbons in DPF 19, it should be noted that in some embodiments the regeneration profile, as illustrated in FIG. 5, with a variable preheat time $t_{p-heat}$ may be used for regeneration in all cases. In these embodiments, the duration of the preheat time $t_{p-heat}$ may be selected based on the estimated amount of accumulated hydrocarbons in DPF 19. And, when the estimated amount of accumulated hydrocarbons in DPF 19 is below a threshold value, the duration of preheat may be set to zero (i.e., $t_{p-heat}=0$), to result in the regeneration profile of FIG. 4.

INDUSTRIAL APPLICABILITY

The exhaust preheat strategy of the current disclosure may be beneficial for any internal combustion engine application to remove accumulated hydrocarbons from the exhaust so that an uncontrolled exothermic reaction may be prevented during regeneration. Such engine applications may include stationary applications, such as engines used to drive power generation sets, or mobile applications, such as engines used in mobile machines.

During some operating conditions of engine, such as, for example, during the cold start phase of engine operation and during some engine faults (extended cranking, fuel injector faults, failed ignitions and flameouts of the burner, etc.), the hydrocarbons emitted in the exhaust may be high. These hydrocarbons may accumulate in an exhaust after-treatment device (such as, for example, a DPF or a DOC) along with particulate matter such as soot. The accumulated hydrocarbons may cause an uncontrolled exothermic reaction in the after-treatment device during regeneration. Such an uncontrolled exothermic reaction may increase the temperature of the after-treatment device to above an acceptable temperature and adversely affect the reliability of the device. Therefore, the after-treatment device may be preheated to evaporate at least a portion of the accumulated hydrocarbons prior to soot oxidation during regeneration. To illustrate the preheat strategy, an exemplary application will now be described.

In an exemplary application, engine 14 along with exhaust treatment system 16 of FIG. 1 may be part of a mobile machine. During operation of the mobile machine, the machine may experience several excess hydrocarbon emission events, such as, for example, three fail to ignite events, two loss of combustion events, and a cumulative crank time of 10 seconds. At the occurrence of these events, controller 32 may set the fail to ignite flag 122, the loss of combustion flag 124, and the extended cranking flag 126. The controller 32 may also assign time values ($t_1$, $t_2$, and $t_3$) to these excess hydrocarbon emission events from a map. For example, the controller 32 may assign a value of 30 seconds for $t_1$, a value of 20 seconds for $t_2$ and a value of 0 seconds for $t_3$ based on maps that relate time to each of these events. These time values may represent the duration of time for which the DPF 19 must be held at a selected preheat temperature to evaporate a certain amount of the hydrocarbons emitted as a result of the respective excess hydrocarbon emission events.

During operation of the mobile machine, the controller 32 may continuously monitor the soot load of DPF 19. The soot load may be monitored using the difference in pressure readings of the upstream pressure sensor 52 and the downstream pressure sensor 56. When this monitored soot load reaches a threshold value, controller 32 may trigger regeneration of DPF 19 (step 110 of FIG. 2). When the regeneration is triggered, controller 32 may check to see if a flag indicating the occurrence of an excess hydrocarbon emission event is set. Since a flag is set, the controller 32 may check a record of the temperature measured by the second temperature sensor 54 to determine if the temperature of the exhaust exiting the DPF 19 has been above a predetermined value for a predetermined amount of time. If it has not, the controller 32 may consider that the accumulated hydrocarbons in DPF 19 may cause an uncontrolled exothermic reaction during regeneration. To reduce the possibility of such a reaction, the controller 32 may determine the time $t_{p-heat}$ (step 160 of FIG. 2) for which the DPF 19 should be held at the selected preheat temperature so as to evaporate at least a portion of the hydrocarbons accumulated therein. The preheat time $t_{p-heat}$ may be determined as the maximum of $t_1$, $t_2$, and $t_3$ (that is, 30 seconds in this case). The controller 32 may then preheat the DPF to the selected preheat temperature of $T_1$ (for example about 500° C.) and maintain this temperature for a hold time of 30 seconds. The controller 32 may heat DPF 19 and maintain the DPF at the preheat temperature by activating and controlling the burner assembly 30. After the expiry of 30 seconds, the controller 32 may continue to heat the DPF 19 along any desired regeneration profile to regenerate DPF 19.

By evaporating at least a portion of the accumulated hydrocarbons in the after-treatment device prior to soot oxidation, the presently disclosed system may reduce the likelihood of an uncontrolled exothermic reaction during regeneration. Also, since the preheating step is included in the regeneration profile only when excess hydrocarbons may be present in the after-treatment device, the presently disclosed system may reduce the total time of regeneration, and thereby optimize the regeneration process.

It will be apparent to those skilled in the art that various modifications and variations can be made to the disclosed regeneration strategy. Other embodiments will be apparent to those skilled in the art from consideration of the specification and practice of the disclosed regeneration strategy. It is intended that the specification and examples be considered as exemplary only, with a true scope being indicated by the following claims and their equivalents.

What is claimed is:

1. A method of regenerating a particulate filter of an exhaust system of an engine system, comprising:
determining a condition indicative of an accumulation of hydrocarbons in the particulate filter;
monitoring the particulate filter to determine when to initiate regeneration of the particulate filter;
selecting a hold time at a first temperature based on the determined condition;
selecting a regeneration profile for regeneration of the particulate filter based on the determined condition; and
regenerating the particulate filter in accordance with the regeneration profile wherein determining the condition includes determining whether at least one of the following events have occurred: a burner of the exhaust system upstream of the particulate filter fails to ignite, a flame in the burner gets extinguished, a cumulative crank time of an engine of the engine system exceeds a preselected value, a servicing of the engine system, and a fault event of the engine system; and wherein determining the condition further includes determining a number of events that occurred, duration, or type of the events that occurred.

2. The method of claim 1, wherein determining the condition includes monitoring a temperature of the exhaust exiting the particulate filter.

3. The method of claim 2, wherein determining the condition further includes monitoring a duration of time the temperature of the exhaust exiting the particulate filter is above a threshold temperature.

4. The method of claim 1, wherein the selecting a regeneration profile includes selecting a temperature profile that includes a temperature hold step which is configured to evaporate at least a portion of hydrocarbons accumulated in the particulate filter prior to a step of oxidizing particulate matter.

5. The method of claim 1, wherein the selecting a regeneration profile includes determining a preheat time, the preheat time being a duration of time the particulate filter is maintained at a preheat temperature.

6. The method of claim 5, wherein determining a preheat time includes selecting a preheat time based on the condition determined.

7. The method of claim 1, wherein monitoring the particulate filter to determine when to initiate regeneration includes determining when an amount of particulate matter in the particulate filter exceeds a threshold value.

8. The method of claim 7, wherein the threshold value is based on an altitude of the engine system.

9. An exhaust system of an engine system, comprising:
a particulate filter configured to remove particulate matter from an exhaust flow of the engine system;
a heating system configured to increase the temperature of the particulate filter for regeneration; and
a controller configured to identify the occurrence of the following events: a burner of the exhaust system upstream of the particulate filter fails to ignite, a flame in the burner gets extinguished, a cumulative crank time of an engine of the engine system exceeds a preselected value, a servicing of the engine system, and a fault event of the engine system, and select a regeneration profile for regeneration of the particulate filter based on the identified events.

10. The exhaust system of claim 9, wherein the controller is configured to monitor a temperature of the exhaust exiting the particulate filter, and a duration of time the temperature is above a threshold temperature.

11. The exhaust system of claim 9, wherein the selected regeneration profile includes a temperature hold step which is configured to evaporate at least a portion of hydrocarbons accumulated in the particulate filter prior to a step of oxidizing particulate matter in the exhaust system.

12. The exhaust system of claim 9, wherein the controller is further configured to initiate the regeneration when a triggering condition occurs, the triggering condition being based on an altitude of the engine system.

13. A method of regenerating a particulate filter positioned in an exhaust flow of an engine system, comprising:
monitoring the particulate filter to determine when to initiate regeneration of the particulate filter;
selecting a hold time at a first temperature based on an estimated accumulation of hydrocarbons in the particulate filter; and
regenerating the particulate filter using a temperature profile that includes the hold time at the first temperature prior to an oxidation of particulate matter at a second temperature higher than the first temperature; wherein selecting a hold time includes determining whether one or more of the following events have occurred: a burner of the exhaust system upstream of the particulate filter fails to ignite, a flame in the burner gets extinguished, a cumulative crank time of an engine of the engine system exceeds a preselected value, a servicing of the engine system, and a fault event of the engine system; and wherein selecting a hold time further includes determining a number of events that occurred, duration, or type of the events that occurred.

14. The method of claim 13, wherein selecting a hold time includes determining a duration of time at the first temperature needed to evaporate at least a portion of accumulated hydrocarbons.

15. The method of claim 13, further including monitoring a temperature of the exhaust exiting the particulate filter and a duration of time the temperature is above a threshold temperature.

16. The method of claim 13, wherein monitoring the particulate filter to determine when to initiate regeneration includes determining when an amount of particulate matter in the particulate filter exceeds a threshold value, the threshold value being selected to be lower at higher altitudes and higher at lower altitudes.

* * * * *

UNITED STATES PATENT AND TRADEMARK OFFICE
CERTIFICATE OF CORRECTION

PATENT NO. : 8,407,989 B2
APPLICATION NO. : 12/754756
DATED : April 2, 2013
INVENTOR(S) : Leustek et al.

Page 1 of 1

It is certified that error appears in the above-identified patent and that said Letters Patent is hereby corrected as shown below:

In the Specification

Column 2, line 32, delete "DOCS," and insert -- DOCs, --.

Signed and Sealed this
Eleventh Day of August, 2015

Michelle K. Lee
*Director of the United States Patent and Trademark Office*